United States Patent [19]
Pressel et al.

[11] Patent Number: 5,900,825
[45] Date of Patent: May 4, 1999

[54] SYSTEM AND METHOD FOR COMMUNICATING LOCATION AND DIRECTION SPECIFIC INFORMATION TO A VEHICLE

[75] Inventors: Richard J. Pressel, Yardley, Pa.; Michael G. Pressel, New York; Barry A. Groupp, Pearl River, both of N.Y.

[73] Assignee: Manitto Technologies, Inc., Long Island City, N.Y.

[21] Appl. No.: 08/690,983

[22] Filed: Aug. 1, 1996

[51] Int. Cl.⁶ ...................................................... G08G 1/09
[52] U.S. Cl. .......................................... 340/905; 340/988
[58] Field of Search ................................... 340/901, 905, 340/988, 995, 928, 990

[56] References Cited

U.S. PATENT DOCUMENTS

| | | | |
|---|---|---|---|
| 1,846,032 | 2/1932 | Hart . | |
| 2,849,701 | 8/1958 | Clark | 340/22 |
| 3,105,119 | 9/1963 | Cory, Jr. et al. . | |
| 3,105,120 | 9/1963 | Hanysz, Jr. et al. | 179/82 |
| 3,626,413 | 12/1971 | Zachmann | 343/8 |
| 3,710,313 | 1/1973 | Kimball et al. | 340/33 |
| 3,961,166 | 6/1976 | Stobart | 235/150.27 |

(List continued on next page.)

FOREIGN PATENT DOCUMENTS

2265041 A 9/1993 United Kingdom .

OTHER PUBLICATIONS

"Department of Transporation Names 1994 IVHS Operational Test Sites," *Global Positioning & Navigation News*, May 5, 1994, pp. 2–3.

"Genesis: A Summary of the Detailed System Design," Report prepared BRW for Guidestar Program, Minnesota Department of Transportation, Mar., 1994, pp. 1–1, 1–2, 2–2, 2–3, 5–1 through 5–11.

Kady, March and Shloss, Peter, "Electronic Messaging Using VRC (Vehicle to Roadside Communications)," 21 pages, date unknown.

U.S. Department of Transportation Intelligent Vehicle Highway Systems, "Operational Tests Program," 4 pages, date unknown.

Product Literature, Cylink Corporation, Sunnyvale, California, Product Literature for Airlink Wireless Modems, 8 pages, date unknown.

Product Literature, "Infra–Red Information System (IRIS) Transmission System," HPW Hani–Prolectron Ag, 2 pages, date unknown.

Product Literature, "Peek Performance," Peek Traffic Co., Tallahassee, Florida, 4 pages, date unknown.

Product Literature, "Portable Beacon Transmitter," Engineering Research Associates, Inc., Vienna, Virginia, 2 pages, date unknown.

Product Literature, "Project Northstar," Nynex, 2 pages, 1994.

Product Literature, "Sightline," Delco Electronics Corp., Kokomo, Indiana, 4 pages, date unknown.

Product Literature, "Travel Aid," Engineering Research Associates, Inc., Vienna, Virginia, 2 pages, date unknown.

*Primary Examiner*—Brent A. Swarthout
*Attorney, Agent, or Firm*—Sterne, Kessler, Goldstein & Fox, P.L.L.C.

[57] ABSTRACT

A system and method for providing information to the operator of a land, water or airborne vehicle includes a wide-area message transmitter for transmitting messages to the vehicle and a vehicle-based receiver system. Each message includes identification information specifying a location (including a direction of travel) for which the message is intended. The receiver system on the vehicle computes its position and direction of travel and compares the position of the vehicle to the intended location indicated by each message. When a match is found, the receiver system provides the matching message to the operator of the vehicle. The messages are digitized voice messages. In a preferred embodiment, the vehicle-based receiver system calculates its position and direction of travel using either GPS or signals received from a local transmitter site.

25 Claims, 4 Drawing Sheets

U.S. PATENT DOCUMENTS

| | | | |
|---|---|---|---|
| 4,075,632 | 2/1978 | Baldwin et al. | 343/6.8 R |
| 4,107,689 | 8/1978 | Jellinek | 343/112 TC |
| 4,182,989 | 1/1980 | Endo et al. | 325/53 |
| 4,251,797 | 2/1981 | Bragas et al. | 340/32 |
| 4,311,876 | 1/1982 | Endo et al. | 179/15.5 ST |
| 4,350,970 | 9/1982 | von Tomkewitsch | 340/905 |
| 4,377,860 | 3/1983 | Godbole | 370/84 |
| 4,529,982 | 7/1985 | Karlstrom et al. | 340/991 |
| 4,533,871 | 8/1985 | Boetzkes | 324/207 |
| 4,562,571 | 12/1985 | Deman et al. | 370/7 |
| 4,633,517 | 12/1986 | Pfeifer | 455/228 |
| 4,706,086 | 11/1987 | Panizza | 340/902 |
| 4,713,767 | 12/1987 | Sato et al. | 364/453 |
| 4,812,832 | 3/1989 | Oishi et al. | 340/709 |
| 4,812,843 | 3/1989 | Champion, III et al. | 340/905 |
| 4,816,827 | 3/1989 | Baloutch et al. | 340/905 |
| 4,819,174 | 4/1989 | Furuno et al. | 340/988 |
| 4,823,138 | 4/1989 | Shibano et al. | 342/457 |
| 4,839,906 | 6/1989 | Leveque et al. | 375/37 |
| 4,870,419 | 9/1989 | Baldwin et al. | 342/50 |
| 4,907,159 | 3/1990 | Mauge et al. | 364/436 |
| 4,920,340 | 4/1990 | Mizuno | 340/905 |
| 4,937,570 | 6/1990 | Matsukawa et al. | 340/905 |
| 4,937,581 | 6/1990 | Baldwin et al. | 342/44 |
| 4,962,457 | 10/1990 | Chen et al. | 364/443 |
| 4,974,099 | 11/1990 | Lin et al. | 358/426 |
| 5,020,143 | 5/1991 | Duckeck et al. | 455/186 |
| 5,126,941 | 6/1992 | Gurmu et al. | 364/424.02 |
| 5,128,669 | 7/1992 | Dadds et al. | 340/901 |
| 5,132,684 | 7/1992 | Pecker et al. | 340/905 |
| 5,132,687 | 7/1992 | Baldwin et al. | 342/44 |
| 5,142,281 | 8/1992 | Park | 340/991 |
| 5,146,219 | 9/1992 | Zechnall | 364/423.098 |
| 5,164,732 | 11/1992 | Brockelsby et al. | 342/44 |
| 5,173,691 | 12/1992 | Sumner | 340/905 |
| 5,193,214 | 3/1993 | Mardus et al. | 455/54.2 |
| 5,196,846 | 3/1993 | Brockelsby et al. | 340/933 |
| 5,206,641 | 4/1993 | Grant et al. | 340/905 |
| 5,214,793 | 5/1993 | Conway et al. | 455/49.1 |
| 5,218,629 | 6/1993 | Dumond, Jr. et al. | 379/59 |
| 5,221,925 | 6/1993 | Cross | 340/988 |
| 5,241,565 | 8/1993 | Kloc et al. | 375/58 |
| 5,245,335 | 9/1993 | Hill et al. | 340/941 |
| 5,247,439 | 9/1993 | Gurmu et al. | 364/424.02 |
| 5,253,275 | 10/1993 | Yurt et al. | 375/122 |
| 5,270,708 | 12/1993 | Kamishima | 340/995 |
| 5,280,632 | 1/1994 | Jung-Gon | 340/905 |
| 5,289,183 | 2/1994 | Hassett et al. | 340/905 |
| 5,297,049 | 3/1994 | Gurmu et al. | 364/436 |
| 5,307,278 | 4/1994 | Hermans et al. | 364/450 |
| 5,315,295 | 5/1994 | Fujii | 340/936 |
| 5,402,348 | 3/1995 | De La Salle et al. | 364/460 |
| 5,406,490 | 4/1995 | Braegas | 340/995 |
| 5,416,711 | 5/1995 | Gran et al. | 364/436 |
| 5,420,794 | 5/1995 | James | 364/436 |
| 5,444,742 | 8/1995 | Grabow et al. | 375/267 |
| 5,465,088 | 11/1995 | Braegas | 340/905 |
| 5,469,360 | 11/1995 | Ihara et al. | 364/449 |
| 5,493,291 | 2/1996 | Brüggemann | 340/905 |
| 5,493,294 | 2/1996 | Morita | 340/990 |
| 5,543,789 | 8/1996 | Behr et al. | 340/990 |
| 5,648,768 | 7/1997 | Bouve | 340/988 |
| 5,649,300 | 7/1997 | Snyder et al. | 340/905 |

SYSTEM AND METHOD FOR COMMUNICATING LOCATION AND DIRECTION SPECIFIC INFORMATION TO A VEHICLE

BACKGROUND OF THE INVENTION

1. Field of the Invention

The invention relates to a system and method for communicating location specific information to a vehicle.

2. Related Art

It has long been considered desirable to transmit information to vehicles, such as automobiles and trucks, traveling along a roadway or boats traveling through a waterway. For example, on land, there are highways that pass through low-lying areas where the atmospheric conditions frequently produce dense fog. To prevent accidents from occurring, it is desirable to communicate a warning to a vehicle prior to its entering the fogged-in area. The warning might, for example, instruct the driver to reduce speed and turn on the vehicle's headlights.

Other situations which create road hazards include standing water, mud slides, rock slides, road constructions, accidents, stalled vehicles, traffic jams and railroad crossings. It is desirable to transmit warning information to vehicles approaching such hazards. This will provide drivers with sufficient time to react appropriately for the situation at hand. In addition to road hazard warning information, other types of information may also be transmitted to the drivers of the vehicles. Such information includes the availability and location of services near an exit of an interstate highway, alternate route/detour directions, traffic control information, rush hour shoulder usage, reversible roadway information, interchange ramp directions, parking information, special restrictions (propane prohibited, commercial traffic restrictions), truck weight and size restrictions and the like.

In a marine environment, it may be desirable to communicate information such as speed restrictions, tide conditions, locale specific weather information, hazard information, service availability, etcetera.

General weather and traffic information has conventionally been transmitted to moving vehicles by radio frequency signals such as conventional AM and FM radio broadcasts. A problem of this conventional approach, however, is that the information is widely broadcast to a large area and is not tailored to specific regions of the roadway. A traffic broadcast normally includes information for an entire metropolitan area and requires that a driver be familiar with the area (i.e., know the name of the roadway, his direction of travel and his position along the roadway) in order to glean from the broadcast information pertinent to his situation.

Thus, it is desirable to tailor the information provided to vehicles (both land vehicles and water vehicles) depending on their exact location and direction of travel. For example, for a hazardous condition only affecting the northbound lanes of a multi-lane highway, it is not necessary to provide warning information to vehicles traveling in the southbound lanes. For information such as availability of services, it is desirable to provide information for a particular highway exit only as a vehicle approaches the exit. Similarly, it may be desirable to provide information regarding the specific location of the particular services only after a vehicle has exited the highway and is on the exit ramp.

It is also desirable to provide information which is tailored to specific lanes of travel of a multi-lane highway. For example, in a highway which includes a plurality of lanes traveling in one direction, it may be desirable to transmit different vehicle class restrictions to the different lanes.

In a marine environment, a waterway may only be navigable in a very narrow channel during low-tide but fully navigable at high tide. It is desirable to communicate this information to a boat approaching the area of the narrow channel but to not communicate this information to boats in nearby channels or to boats traveling away from the narrow channel.

Conventionally, systems have been proposed which would selectively provide information based on direction of travel and/or lane position of a vehicle on a highway. These systems have generally been of two types. In a first type, an inductive loop is embedded in or placed adjacent the roadway. The loop is then driven by a constant frequency oscillator which produces a signal in the 10–20 KHz range. A transmitter modulates the constant frequency signal with the desired information, such as a voice signal. Systems of this type are described in U.S. Pat. No. 3,105,119 to Cory, Jr., et al. and U.S. Pat. No. 3,105,120 to Hanysz.

A major shortcoming of the inductive loop type systems is that the vehicle must be within the electromagnetic field of the loop for the entire time required to transmit the message. For example, in order to transmit a five-second message, the vehicle must be in close proximity to the inductive loop for approximately five seconds. A vehicle traveling 60 mph will travel 88 feet in one second. Thus, in five seconds, the vehicle will have traveled 440 feet. Thus, to transmit a five second message to a vehicle traveling 60 mph, the inductive loop must be at least approximately 440 feet long.

This minimum length assumes that a message broadcast commences immediately and is synchronized with a vehicle entering a loop. However, it is possible that a message may already be transmitting when a vehicle enters the loop. In order to receive the full message, the vehicle must be in the loop a sufficient time to allow the partially completed message to finish before it is rebroadcast. Thus, the a loop must actually be twice as long as that required for a perfectly synchronized message. Thus, for the example above, the loop would have to be at least 880 feet long. As can be appreciated, for longer messages, the length of the loop will increase proportionately. Similarly, for vehicles traveling at faster speeds, the length of the loop must be increased proportionately.

A further disadvantage of the inductive loop type systems is that the loop must be embedded in the roadway. This normally requires that grooves be cut into the road surface to receive the loop.

Another method which has been conventionally proposed for transmitting information to vehicles is the use of directional signals such as microwaves. It has been proposed that microwave transmitters be mounted adjacent or above a roadway with highly directional beams directed downward onto passing vehicles. Such a system would eliminate the need for the cumbersome inductive loops. Such systems are described in U.S. Pat. No. 5,128,669 to Dadds et al. and U.S. Pat. No. 5,214,793 to Conway et al.

While the microwave-based systems eliminate the need to cut a roadway and install very long inductive loops, they suffer from the same shortcoming as the inductive loop based systems. In order to send a five-second long voice signal to a vehicle traveling 60 mph, the vehicle must be within the microwave beam for approximately 880 feet. This limits the length of messages which may be sent to a vehicle to only a bare minimum size.

The system proposed by Conway et al. in the '793 patent attempts to solve this problem by providing a database of messages in the receiver mounted in the vehicle. The transmitters then transmit only a short encoded signal. A microprocessor-based system in the receiver decodes the encoded signals and retrieves a prerecorded message from the database or constructs a message from prerecorded message parts stored in the database. The messages in the database may be changed or tailored to specific areas of operation by replacing the database. The presence of the database, however, limits the flexibility of the system to only transmitting and decoding messages which have been previously defined.

U.S. Pat. No. 4,311,876 to Endo et al. proposes a system in which a voice message is digitized and time compressed before being sent to a vehicle using a directional microwave beam. Time compression is achieved by clocking the voice message out of a memory at a rate much greater than that which is later used to reproduce the voice message for human intelligibility. This time compression decreases the time that a vehicle must be in the microwave beam to receive a voice message. Thereby, the size of the voice message that can be transmitted to a passing vehicle is increased.

However, a problem with a system such as the one described by Endo el al. is that it cannot reliably provide direction specific information. For example, a message intended for a vehicle traveling in a southbound lane of a two lane roadway may (by reflection or directly) receive a message intended for northbound vehicles. It is desirable to have a system in which this possibility is minimized.

In a marine environment, radio broadcasts are normally used to communicate information to boaters. Wide-area radio broadcasts, however, do not allow locale-specific messages to be delivered.

What is needed is a system that overcomes the limitations of the prior art and provides a low cost system that may be practically implemented and will reliably communicate messages to vehicles.

SUMMARY OF THE INVENTION

The present invention is a system for communicating a message to a vehicle traveling on a roadway, waterway, railway or airway. For ease of discussion, the invention is described in the environment of a roadway. The system includes a vehicle-mounted receiver system and a wide-area message transmitter site for transmitting messages to the vehicle. The vehicle-mounted receiver system includes position determining means. Each message from the transmitter includes identification information specifying roadway location (including a direction of travel) for which the message is intended. The receiver system on the vehicle compares the position of the vehicle to the intended location indicated by each message. When a match is found, the receiver system provides the matching message to the operator or driver of the vehicle.

In the preferred embodiment, the position determining means includes both a global positioning system (GPS) receiver and a steering receiver. The GPS receiver receives signals from GPS satellites and calculates vehicle positions therefrom. The intended location and direction of travel contained in each message may be represented by two GPS positions located on a roadway and spaced apart by a predetermined distance.

The steering receiver receives messages from a roadside (or local) transmitter site. The roadside transmitter site includes at least first and second roadside transmitters. Each roadside transmitter transmits a roadside signal toward the roadway. The receiver system onboard the vehicle receives the roadside signals and determines whether to provide a message to the driver of the vehicle based on the order of receipt of the roadside signals.

Each roadside transmitter includes a directional antenna. One antenna is aimed in a first direction down the roadway while the other antenna is aimed in the other direction down the roadway. Thus, a vehicle traveling in a first direction will receive a first roadside signal before receiving the other roadside signal. A vehicle traveling in the other direction will receive these signals in the opposite order. This principle is used to provide specific messages to vehicles traveling in different directions on a roadway.

In another embodiment of the invention, one of the roadside transmitters provides the message to the vehicle as part of its roadside signal. While the message transmitter is the primary means for delivering messages to the vehicle-based receiver system, in certain circumstances it may be desirable to use the roadside signals for messaging. For example, in certain rural areas where it is desired to deliver only a few messages at wide distances, it may not be cost justified to use a wide-area transmitter. In such an environment, it may be preferred to put a roadside transmitter site at each location where messaging is desired.

Also in the preferred embodiment, the vehicle-based receiver system uses GPS as its primary means for determining position and direction of travel. The roadside transmitter sites are used to supplement GPS. For example, in certain urban areas (e.g., adjacent tall building, in tunnels, and under overpasses), GPS may not be available. In these locations, the roadside transmitter sites can be used by the vehicle-based receiver system for determining vehicle position and direction of travel.

In the preferred embodiments of the invention, the message is a digitized voice message which provides traffic, weather, road use restrictions, detour, services and other information to vehicles traveling on a roadway.

Also in the preferred embodiment of the invention, the wide-area message transmitter is an FM transmitter. The roadside transmitters are low-power FM transmitters. The two roadside signals may use the same carrier frequency. The FM "capture effect" helps assure that the roadside signals will be received in the proper order.

An advantage of the system is that it achieves high specificity in that different messages may be provided to vehicles traveling in different directions on a roadway.

Another advantage of the invention is that the wide-area message transmitters, the roadside transmitter sites and the vehicle-based receiver systems are relatively inexpensive to implement.

The foregoing and other features and advantages of the invention will be apparent from the following more particular description of a preferred embodiment of the invention, as illustrated in the accompanying drawings.

DETAILED DESCRIPTION OF THE PREFERRED EMBODIMENT

The preferred embodiment of the invention is discussed with reference to the figures in which like reference numbers indicate like elements. Furthermore, the left most digit of each reference number indicates the number of the figure in which the number first appears. While specific part numbers and configurations are discussed, it should be understood that this is done for illustration purposes only. A person skilled in the art will recognize that other components and configurations may be used without departing from the spirit and scope of the invention.

Overview

Figure 1:
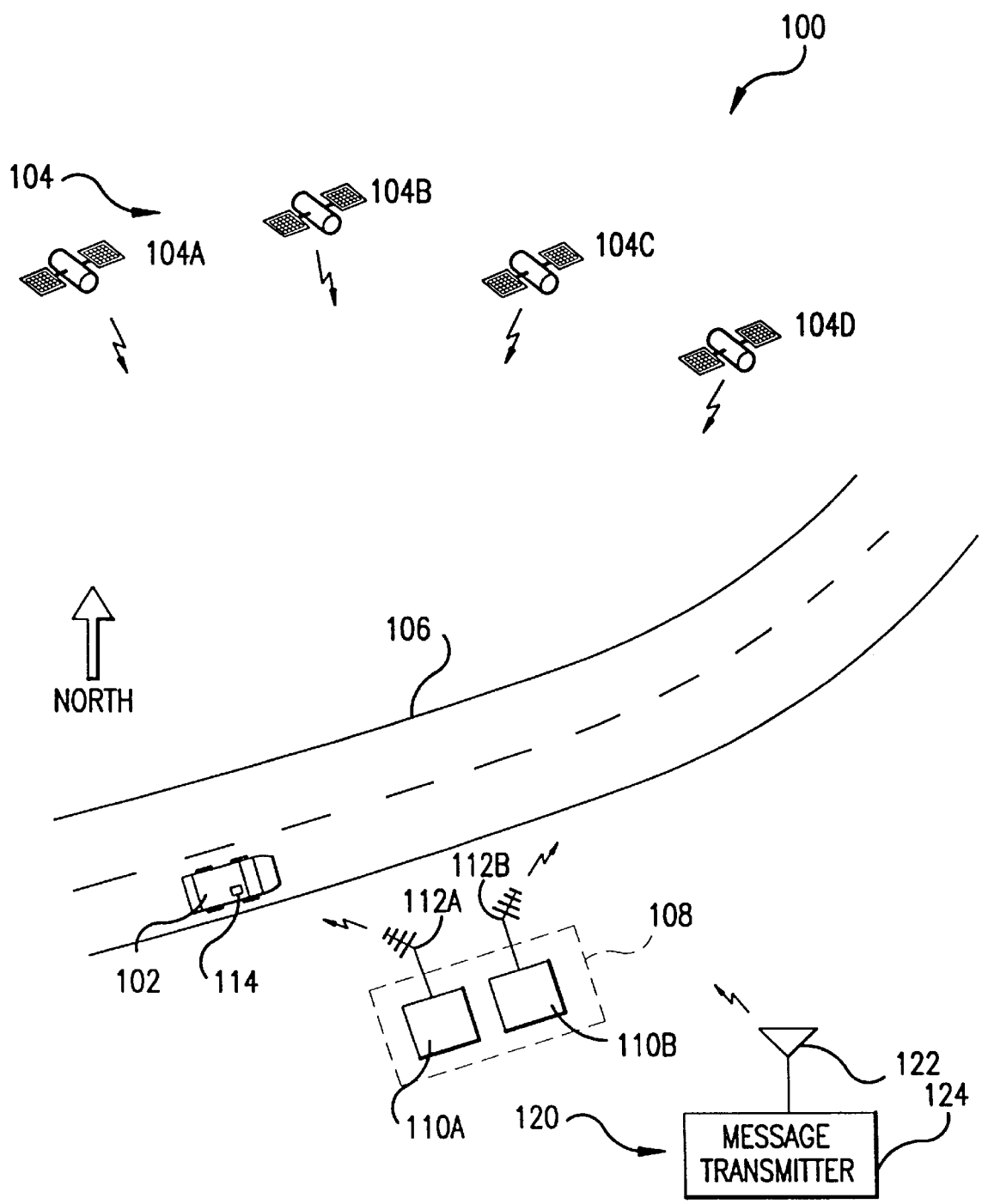
FIG. 1 is a diagram illustrating implementation of the highway information system of the invention in the environment of a two lane roadway.

A highway information system 100 according to the present invention is illustrated in FIG. 1. For purposes of illustration, system 100 is described in the environment of a roadway 106 upon which a vehicle 102 is traveling. It should be understood, however, that system 100 has equal applicability to vehicles (e.g., boats) traveling on a waterway or to vehicles (e.g., airplanes) traveling in the airways. Vehicle 102 is shown driving in an east-bound direction on roadway 106.

Highway information system 100 includes satellite-based positioning system 104, a wide-area message transmitter site 120 and a vehicle-mounted receiver system 114. In one embodiment, system 100 also includes a local or roadside transmitter site 108. Roadside transmitter site 108 includes roadside transmitters 110A and 110B. Transmitters 110 transmit roadside signals toward roadway 106 via antennas 112.

Satellite-based positioning system 104 includes a plurality of satellites 104A–104D. In a preferred embodiment, positioning system 104 is the Global Positioning System (GPS). For ease of discussion, positioning system 104 will hereinafter be referred to simply as GPS 104. Signals received from GPS 104 are used by receiver system 114 to determine the position of vehicle 102.

Message transmitter site 120 includes a message transmitter 124 and an antenna 122. Message transmitter 124 transmits a plurality of messages over a wide area (e.g., an entire town or a portion of a metropolitan area). Message transmitter 124 may be, for example, an FM transmitter. The messages include information that is desired to be transmitted to vehicles at specific locations on roadways (including roadway 106) in the area serviced by wide-area message transmitter site 120. The messages transmitted by message transmitter 124 may include specific messages destined for vehicles traveling in different directions on many different roadways.

To accomplish location specific messaging in accordance with the invention, each message transmitted by message transmitter 124 includes information identifying the location (e.g., the position on a roadway) of a vehicle 102 for which the message is intended. Vehicle-mounted receiver system 114 receives the plurality of messages broadcast by message transmitter site 120 and stores them in a memory. Receiver system 114 also receives signals from GPS 104. The signals from GPS 104 are used by receiver system 114 to determine a position of vehicle 102. This position is then used by receiver system 114 to select the appropriate message (previously received from message transmitter site 120 and stored in memory) to be provided to the operator of vehicle 102.

To accomplish location and direction of travel specific messaging in accordance with the invention, each message transmitted by message transmitter 124 includes information identifying the location and the direction of travel of a vehicle 102 for which the message is intended. In the preferred embodiment, the location and direction specifying information is in the form of two points on the surface of the Earth. For example, given points A and B separated by a distance of 100 meters on a roadway, the direction of travel of a vehicle can be distinguished based on the order in which the two points are passed.

Receiver system 114 keeps a short history of the positions of vehicle 102 as it travels on the roadway. These positions are compared to the two intended locations accompanying each message. If the match is in the right order, the message is provided to the operator of the vehicle.

In this manner, using GPS 104 for position determination and using wide-area message transmitter site 124 for messaging, location and direction specific information can be transmitted to vehicle 102 traveling on roadway 106.

In the preferred embodiment of the invention, the messages are digitized voice messages. This allows audible messages to be provided to the operator of the vehicle with minimal distraction. Voice messages have the advantage that they do not require the driver of the vehicle to take his or her eyes off the roadway. Moreover, voice inflection, rate, and loudness may be varied for emphasis. For example, to communicate an emergency message, the human voice may carry an emphatic tone. For more routine information, less inflection may be used.

In an alternate embodiment, the messages provided by system 100 may be video images rather than audio messages. For example, the message may be video-frame information that could be displayed on a heads-up display. Adapting system 100, as described herein below, to communicate video image information rather than voice messages would be apparent to a person skilled in the relevant art having the benefit of this disclosure.

The information communicated by the voice messages of the invention may include, for example, traffic, weather, road use restrictions, detour, services and other information. Different information can be provided to vehicles traveling in different directions on the same roadway or waterway. In a marine environment, the information can include speed restrictions, tide conditions, locale specific weather information, hazard information, service availability, etcetera. In aviation, the information may include warnings for restricted air space, warning for special altitude restrictions, weather information, etcetera.

As explained above, GPS 104 provides position information and wide-area message transmitter site 120 provides the messages to vehicle 102. Either or both of these functions (messaging and positioning) may also be performed by roadside transmitter site 108. Roadside transmitter site 108 operates as follows.

Each roadside transmitter 110 transmits a distinct roadside signal. In the preferred embodiment, the roadside signals are low power FM (frequency modulation) signals. Antennas 112 are directional antennas. As illustrated in FIG. 1, antenna 112A is pointed in a first direction (e.g., West) down roadway 106. Antenna 112B is pointed in a second direction (e.g., East) down roadway 106. Thus, roadside transmitter 110A can transmit a first roadside signal in a first direction while roadside transmitter 110B transmits a second roadside signal in the opposite direction along roadway 106.

As vehicle 102 travels in an East-bound direction past roadside transmitter site 108, it will receive the roadside signal from roadside transmitter 110A prior to receiving the signal from roadside transmitter 110B. Similarly, a vehicle 102 traveling in a West-bound direction will receive the signal from roadside transmitter 110B prior to receiving the signal from roadside transmitter 110A. The location of roadside transmitter site 108 defines a position at which a message is to be delivered. The order of receipt of signals from transmitters 110A and 110B indicate the direction of travel of a vehicle. Thus, roadside transmitter site 108 can be used like GPS 104 for determining vehicle position and direction of travel.

Roadside transmitter site 108 can also perform the messaging function of wide-area message transmitter site 120. An example of how roadside transmitter site 108 may deliver a message to a vehicle is provided below. Roadside transmitter 110A transmits a first roadside signal (signal A) and roadside transmitter 110B transmits a second roadside signal (signal B). Signal B includes a message intended for east-bound vehicles. As vehicle 102 travels in an east-bound direction past transmitter site 108, it will receive signal A prior to receiving signal B. Upon receipt of signal A, vehicle-mounted receiver system 114 listens for signal B. Then, upon receiving signal B, vehicle-mounted receiver system 114 decodes the message and provides it to the driver of the vehicle. Note, however, that a west-bound vehicle would receive signal B prior to receiving signal A. In this case, the vehicle-mounted receiver system 114 would not provide the message in signal B to the driver of the vehicle. Thus, in this example implementation, roadside transmitter site 108 would provide direction-specific information only to east-bound vehicles.

The inventors contemplate that message transmitter 124 may be used as the primary means for delivering messages to receiver system 114 and that GPS 104 may be used by receiver system 114 as its primary means for determining position and direction of travel. Roadside transmitter sites 108 may be used to supplement such an embodiment. For example, in certain rural areas where it is desired to deliver only a few messages at wide distances, it may not be cost justified to use a wide-area transmitter. In such an environment, it may be preferred to put a roadside transmitter site 108 at each location where messaging is desired.

In addition, it may be preferred to use roadside transmitter sites 108 in an environment where GPS may not be reliably available. For example, in urban areas with tall buildings and tunnels, GPS may not be reliably available. Roadside transmitter sites 108 will work well in such areas.

Thus, in the preferred embodiment, system 100 is operable in any one of four different modes:

(1) wide-area transmitter site 120 for messaging and GPS 104 for positioning;

(2) wide-area transmitter site 120 for messaging and roadside transmitter site 108 for positioning;

(3) roadside transmitter site 108 for messaging and GPS 104 for positioning; and (4) roadside transmitter site 108 for messaging and positioning.

Roadside Transmitter Site 108

Roadside transmitter sites 108 includes roadside transmitters 110A, 110B and their respective antennas 112A, 112B. Roadside transmitters 110A and 110B includes control and memory circuitry (not shown) for storing the messages that are transmitted by roadside transmitters 110. In a preferred embodiment, roadside transmitters 110 include FM modulation and amplification circuitry to modulate and transmit encoded messages. The encoded messages may be remotely updated or modified via conventional telephone lines, radio frequency communications or paging networks. Further, roadside transmitters 110 may be remotely instructed to turn transmitters ON or OFF.

In a preferred embodiment, low-power FM signals are used by transmitters 110. Each transmitter 110 uses the same carrier frequency for modulation. An advantage of FM is that a receiver, based on the "capture effect," will latch onto the strongest available signal at a given frequency and will ignore other signals. This advantage allows a single carrier frequency to be used for transmitters 110A and 110B. In alternate embodiments, different carrier frequencies may be used for the different transmitters 110 of a transmitter site 108.

In this preferred embodiment, the steering information is contained in subaudible tones of the FM signal. Subaudible tones are well known in the art and their use for purposes of carrying steering information would be apparent to a person skilled in the relevant art after reading the present disclosure.

Receiver system 114 is configured to receive the roadside signals from transmitters 110. In the preferred embodiment, receiver system 114 includes an FM receiver (discussed below as steering receiver 202) to receive the FM signals from transmitters 110. The first and second roadside signals from transmitters 110 communicate information to vehicle 102 when vehicle 102 is in the vicinity of roadside transmitter site 108. Using the dual transmitter 110 arrangement of roadside transmitter site 108, the present invention is able to deliver direction-specific messages to vehicles 102. For example, a first message may be provided to west-bound vehicles, while a second message is provided to east-bound vehicles. This direction-specific messaging is keyed on the order of receipt of the roadside signals from transmitters 110A and 110B.

To accomplish this direction-specific messaging, receiver system 114 receives the roadside signals and determines which message to provide to the driver of a vehicle based on the order of receipt of the roadside signals and based on information contained within the roadside signals.

Thus, a primary function of the roadside transmitters 110 is to tell receiver system 114 where it is (i.e., near a certain roadside transmitter site 108) and which direction it is traveling on the roadway. The roadside signals may be simple FM signals carrying little information. For example, each signal may merely provide information such as "I am signal A" or "I am signal B." This is enough information for the receiver system to determine, for messaging purposes, where it is and what direction it is traveling.

That is, because the signals are low power and are transmitted in different directions down the roadway, a receiver system receiving the signals in the proper order (e.g., A then B) must be passing the roadside transmitter site. Thus, the receiver system knows where it is only to the extent of "I just passed transmitter site A-B or B-A (depending on the direction of vehicle travel)." An actual Earth-coordinate position is not required. It is only necessary for the receiver system to know whether it is at a position on a roadway that matches a position indicated in a message. Each message includes information to facilitate this matching. For example, a message that says "construction ahead, maintain a maximum speed of 30 miles per hour," will have header information that indicates that the message should be provided to south-bound vehicles at transmitter site A-B (i.e., not B-A which might indicate a north-bound direction of travel).

Because of the functions that are performed by the roadside signals, the information that they communicate to the vehicle-based receiver system may be called "steering" information. Once receiver system 114 has this steering information, it is ready to find the correct message to provide to the driver.

As discussed above, the message that receiver system 114 provides to the driver of the vehicle can come, for example, from several sources. The message may be received from wide-area message transmitter site 120 and stored in memory. Alternatively, the message may be carried to receiver system 114 by one of the roadside signals from roadside transmitters 110.

An example of how roadside transmitter site 108 may deliver a message to a vehicle is provided below. Roadside transmitter 110A transmits a first roadside signal (signal A) and roadside transmitter 110B transmits a second roadside signal (signal B). Signal B includes a message intended for east-bound vehicles. As vehicle 102 travels in an east-bound direction past transmitter site 108, it will receive signal A prior to receiving signal B. Upon receipt of signal A, vehicle-mounted receiver system 114 listens for signal B. Then, upon receiving signal B, vehicle-mounted receiver system 114 decodes the message and provides it to the driver of the vehicle. Note, however, that a west-bound vehicle would receive signal B prior to receiving signal A. In this case, the vehicle-mounted receiver system 114 would not provide the message in signal B to the driver of the vehicle. Thus, in this example implementation, roadside transmitter site 108 would provide direction-specific information only to east-bound vehicles.

Another example of operation of the first embodiment of receiver system 114 is now described. As before, signal B includes a message for east-bound vehicles. In addition, signal A includes a message for west-bound vehicles. For vehicles traveling in an east-bound direction, the message from signal B would be provided to the driver of vehicle 102 as described above. For vehicles traveling in a west-bound direction, receiver system 114 would receive signal B prior to receiving signal A. In this case, vehicle-mounted receiver system 114 would provide the message from signal A to the driver of the vehicle. Thus, distinct messages may be provided to passing vehicles based on the direction of travel.

Note that in these two examples, receiver system 114 will play a message provided in the second received roadside signal but not the message in the first received roadside signal. Thus, receiver system 114 expects to receive signal B then signal A before it will play signal A's message. Similarly, receiver system 114 expects to receive signal A then signal B before it will play signal B's message. This functionality is a function of the programming of receiver system 114. The programming may be preset or may be controlled by instructions embedded within signals A or B. For example, in an alternate embodiment, signal A's message may be played only if signal A is received before signal B is received.

As discussed above, the inventors contemplate that wide-area message transmitter site 120 may be used as the primary means for delivering messages to receiver system 114 and that GPS 104 may be used by receiver system 114 as its primary means for determining position and direction of travel. Roadside transmitter sites 108 may be used to supplement such an embodiment. In addition to the rural and urban uses discussed above for roadside transmitter site 108, another use is contemplated.

If different messages are desired to be communicated to vehicles traveling on different but closely adjacent roadways, roadside transmitter sites 108 may be used instead of GPS 104. For example, on a cloverleaf interchange of an interstate highway, it may be desired to provide a different message at each exit ramp and on-ramp. GPS 104 may be used for position, only if the accuracy of the GPS receiver (discussed below) within receiver system 114 is sufficient to discriminate the closely positioned message sites. For example, if four message sites are within 100 meters of one another, the GPS receiver must have an accuracy significantly better than 100 meters and preferably on the order of 10 meters. Non-differential (i.e., open-ended) GPS receivers with accuracies in the 100 meter range are commercially available at reasonable prices. Receivers with higher accuracies are more expensive. Thus, in building a system according to the invention, the cost of roadside transmitter sites 108 must be weighed against the cost of increased GPS accuracy and the desire to provide message sites that are in close proximity to one another.

Wide-area Message Transmitter Site 120

In the preferred embodiment of the invention, wide-area message transmitter is an FM transmitter that transmits a plurality of encoded digital voice messages. A variety of known encoding schemes may be used. The particular encoding scheme is not important to the present invention. It is preferred, however, that some compression scheme be used to compress the data being transmitted and reduce bandwidth requirements.

Each encoded digital voice message includes some digital information that identifies a location for which the message is destined. That is, each voice messages includes information that defines a location at which the message should be provided to the driver of the vehicle. In the preferred embodiment, this location information may be two points on a roadway. As discussed above, two points are used to define directionality. If a message if not direction specific, a single point may be used.

Receiver System 114

Figure 2:
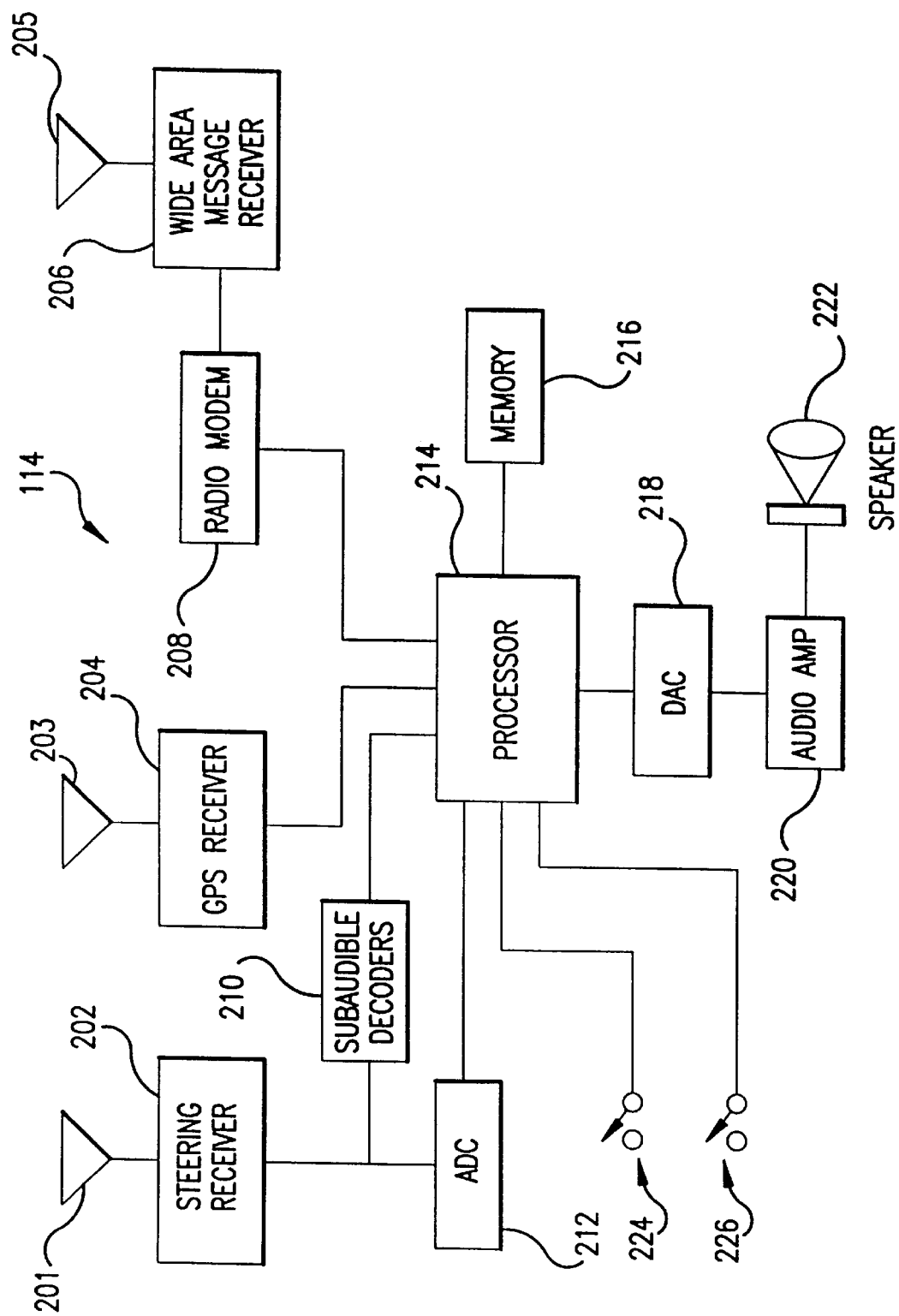
FIG. 2 is a block diagram of a vehicle-based receiver system.

FIG. 2 illustrates a preferred embodiment of vehicle-mounted receiver system 114. In this first preferred embodiment, vehicle-mounted receiver system 114 includes a steering receiver 202, a GPS receiver 204, a wide-area message receiver 206, antennas 201, 203 and 205, radio modem 208, subaudible decoders 210, analog-to-digital converter (ADC) 212, processor 214, memory 216, digital-to-analog converter (DAC) 218, audio amplifier 220, speaker 222 and switches 224 and 226.

Steering receiver 202 is configured to receive roadside signals from roadside transmitter site 108. As discussed above, the roadside signals from the roadside transmitter site 108 may provide messaging and/or positioning for receiver system 114. GPS receiver 204 is configured to receive position signals from GPS 104 and to compute a position of receiver system 114 therefrom. Wide-area message receiver 206 is configured receive a message signal from wide-area message transmitter site 120.

Operation of receiver system 114 is controlled by processor 214. Messages received from steering receiver 202 or from message receiver 206 are received by processor 214 and are stored in memory 216. Position information received from GPS receiver 204 or from steering receiver 202 are used by processor 214 to determine which message in memory 216 is to be provided to the driver of the vehicle.

To play a message, processor 214 retrieves a selected digital message from memory 216 and provides it to DAC 218. DAC 218 converts the digitized voice message and provides an analog voice message to audio amplifier 220. Audio amplifier amplifies the analog voice message and provides it to speaker 222.

Steering Receiver 202

Antenna 201 receives roadside signals from roadside transmitters 110. Steering receiver 202 demodulates these signals. Each roadside signal includes coding (i.e., the steering information) to distinguish it from other roadside signals being broadcast from the same roadside transmitter site. As discussed above, each roadside signal may also include a message.

The demodulated roadside signal is provided by receiver 202 to decoders 210 and to ADC 212. Decoding the roadside signal produces the steering or identification information that is provided to processor 214. The steering data is used by processor 214 to identify the roadside signal. Based on the steering data for the roadside signal (and the steering data from the previously received roadside signal), processor 214 can determine that the vehicle is passing a certain roadside transmitter site and is traveling a certain direction. In the preferred embodiment in which steering information is encoded as subaudible tones of an FM roadside signal, subaudible decoders 210 decode the steering information from the roadside signal and provide the steering information to processor 214.

If the roadside signal includes an analog voice message, ADC 212 digitizes the message and provides it to processor 214 for storage in memory 216. In the preferred embodiment of the invention, messages are digitized and compressed voice messages. In this case, ADC 212 is not required. Steering receiver 202 will demodulate and decompress the voice messages and provide them to processor 214.

GPS Receiver 204

Figure 3:
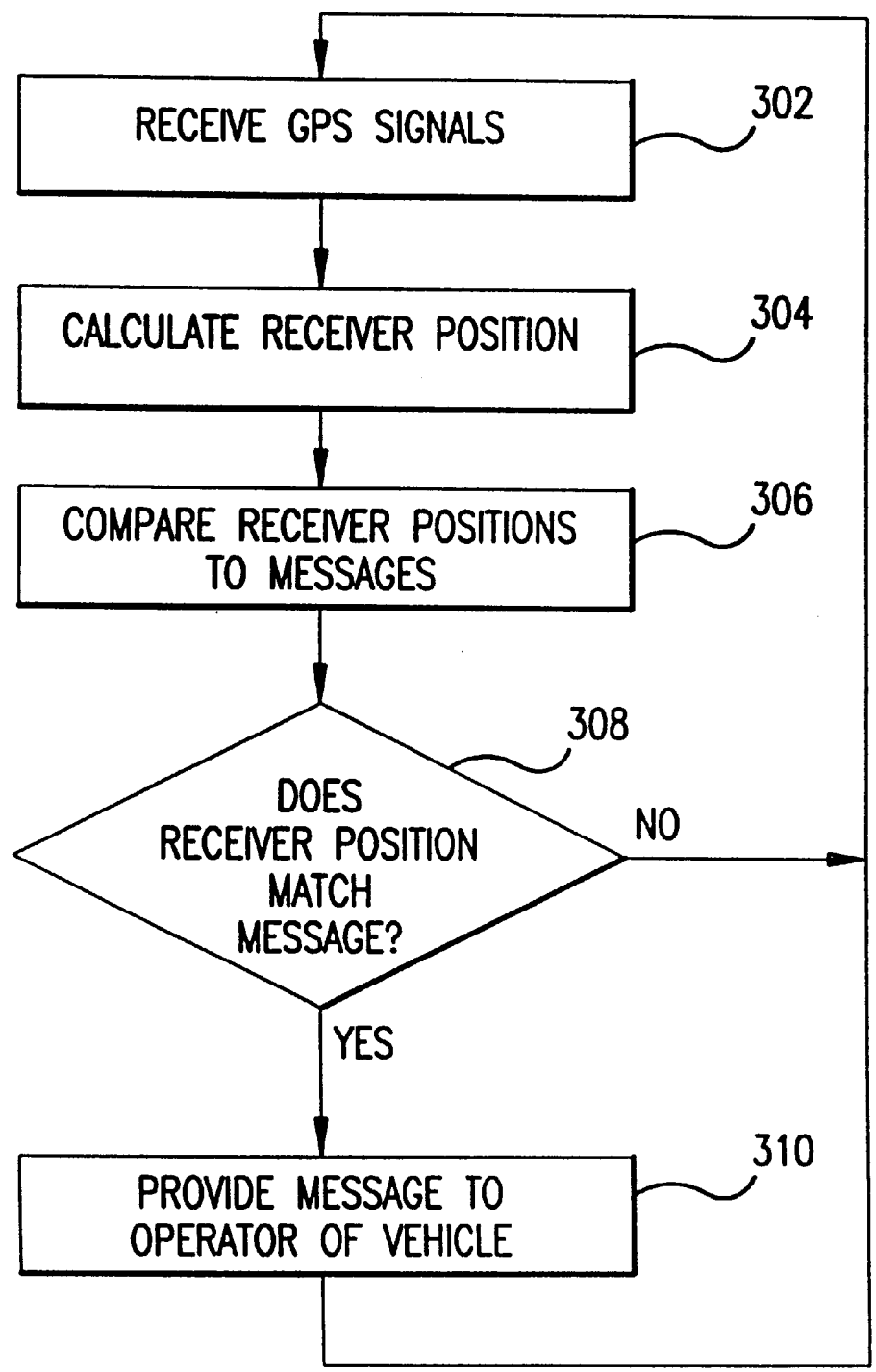
FIG. 3 is a flow chart illustrating operation of the vehicle-based receiver system when receiving GPS signals.

GPS receiver 204 is preferably a commercially available GPS receiver. Operation of GPS receiver 204 and processor 214 is described with reference to FIG. 3. In a step 302, GPS receiver 204 receives signals from the constellation of GPS satellites. In a step 304, GPS receiver 204 calculates its position from the received GPS signals. GPS receiver 204 provides the calculated position to processor 214. In the preferred embodiment, GPS receiver 204 repeats the position calculation approximately ten times per second. Processor 214 then stores a short history of these GPS calculated positions.

In a step 306, the GPS positions are compared to the intended message positions for the messages stored in memory 216. If a match is found, in a step 308, the message is provided to the operator of the vehicle, as illustrated in step 310. If no match is found, in step 308, the method returns to step 302 and repeats.

For non-direction specific messaging, processor 214 need only compare a single GPS computed position to each message stored in memory 216. If a match is found, then the message can be provided to the operator of the vehicle. For example, if GPS receiver 204 can calculate a position to an accuracy of 50 feet, then processor 214 can indicate a match if a GPS indicated position is within, say, 100 feet of an intended position (indicated by the message).

For direction specific messaging, processor 214 must compare at least two GPS computed positions to the messages stored in memory 216. If a match is found for both points in the correct order, then the message can be provided to the operator of the vehicle. For example, if a message includes the intended locations A then B, then processor 214 will compare each GPS calculated position to location A until a match is found. Once a match is found, then processor 214 will check the GPS history (e.g., the last 20 seconds of GPS calculated positions) to look for position B. If position B is found, then the vehicle has passed points A and B in the correct direction and the message will be provided to the driver of the vehicle.

The following example further illustrates functioning of processor 214 and GPS receiver 204. Given an accuracy for GPS receiver 204 of 50 feet, a vehicle traveling less then 100 mph (147 feet/sec), a GPS position calculation rate of ten times per second, then the GPS position calculations will have a tolerance of 64.7 feet. To leave additional safety margin, a tolerance of 100 feet may be assumed. Thus, if a GPS calculated position is within 100 feet of an intended location indicated in a message, then a match may be indicated. When two points are used for direction-specific messaging, the points will have to be at least 200 feet apart. In some areas, it may be desired to add additional margin to this spread. Thus, let's say that points will be spaced apart in the range of 200 to 2000 feet. At a spacing of 2000 feet, a speed of 147 feet/sec and a ten times per second GPS update rate, processor 214 will have to store a GPS position history of at least 136 points (i.e., 2000/14.7).

Wide-Area Message Receiver 206

Figure 4:
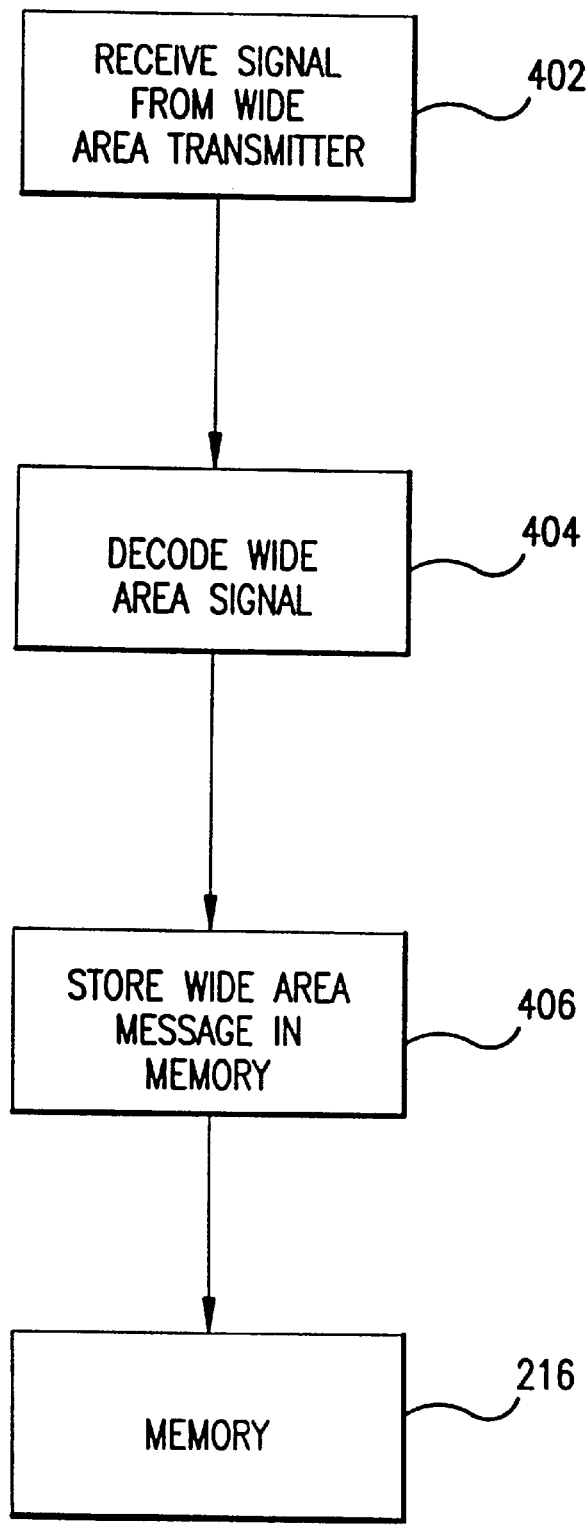
FIG. 4 is a flow chart illustrating operation of the vehicle-based receiver system when receiving messages from a wide-area message transmitter.

Wide-area message receiver 206 is configured to receive messages from wide-area message transmitter site 120 and provide the messages to radio modem 208 for demodulation. Once demodulation is completed, radio modem 208 provides the digital voice messages to processor 214. Processor 214 then stores the messages in memory 216. Operation of wide-area message receiver 206 in conjunction with processor 214 is described with reference to FIG. 4.

Wide-area message signals are received by message receiver 206 in a step 402. The wide-area message signal is decoded in a step 404. Decoding includes demodulation and, if the messages are compressed, decompression. Decoding may be performed by radio modem 208. Alternatively, the functions of radio modem 208 may be incorporated into message receiver 206.

Radio modem 208 provides the decoded messages to processor 214. In a step 406, processor 214 stores the decoded messages in memory 216. Each message includes an intended location and, if desired, an intended direction of travel.

Processor 214

Processor 214 controls operation of receiver system 114 in any one of its four modes of operation. Each mode is described below.

(1) wide-area transmitter site 120 for messaging and GPS 104 for positioning In this mode, processor 214 will receive a wide-area message signal from the message transmitter and will store the messages in memory. These messages will remain in memory until a new wide-area message signal is received. Receipt of a new wide-area message signal will cause the previous messages received from a wide-area transmitter to be replaced. A new wide-area message signal may come from a different wide-area transmitter. Alternatively, a new wide area message may be broadcast from the same wide-area message transmitter. Each wide-area message signal contains an identifier. Processor 214 compares the identifier of the message signal to the identifier of the message signal whose messages are currently occupying memory 216. In addition, each wide-area message signal may include a time stamp. Processor 214 may be programmed to not use messages in memory that are older than a predetermined time (e.g., 1 hour).

GPS calculated positions are received by processor 214 and are continuously compared to the intended locations accompanying each message in memory 216. In addition, processor 214 keeps a short history of past GPS calculated positions for use in determining direction of travel as described above.

(2) wide-area transmitter site 120 for messaging and roadside transmitter site 108 for positioning In this mode of operation, processor functions as in mode (1) with respect to processing wide-area messages. However, roadside signals (also called local signals) from a roadside transmitter site are used for position determination. Upon receipt of a roadside signal from steering receiver 202, processor will compare the roadside indicated position for comparison with the intended locations indicated by the messages in memory 216.

(3) roadside transmitter site 108 for messaging and GPS 104 for positioning In this mode of operation, roadside transmitter site 108 provides one or more messages to receiver system 114. The messages are contained in the roadside signals. Processor 214 stores the messages in memory 216 as described above. Thereafter, the intended locations contained in the messages are compared to GPS position information as described above for mode (1).

(4) roadside transmitter site 108 for messaging and positioning.

In this final mode of operation, roadside transmitter sites are used for positioning and messaging as previously described.

In the preferred embodiment, highway information system 100 can provide various classes of messages to the driver of a vehicle. For example, messages may be classified as either essential (e.g., lane closings, safety instructions, detour information, severe weather conditions, accidents, railroad crossings, direction information for reversible roadways) or optional (e.g., travel information, future construction sites). A commercial category for trucks can include special messages such as clearance, weight, speed, size and hazardous material restrictions.

To accommodate different classes of messages, receiver system 114 includes an optional message switch 224. If the optional message switch is ON, then all messages will be provided to the driver of the vehicle. If the optional message switch is OFF, then only essential messages will be provided to the driver of the vehicle.

A prototype embodiment of the invention has been described for illustration of its features and operation. The inventors anticipate that a commercial embodiment of the invention may be produced as an integral part of vehicle radio/stereo systems. Such an embodiment could automatically mute the radio/stereo or turn the radio/stereo on if it is off to provide an audio message to the driver. Further, the system may automatically engage and power up the radio/stereo upon receipt of an essential message. Similarly, as described above, a switch 224 is provided to filter out optional messages. For essential messages which have already been heard, a mute button may be provided. As a reminder that an essential message has been received while a mute feature is activated, a visual indicator (e.g., a flashing light emitting diode) or an audible beep may be provided.

Receiver system 114 may further include a repeat switch 226. The repeat switch may be used to repeat playback of the last heard message stored in memory 216.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A system for communicating a message to a vehicle, comprising:

(a) transmitter means for communicating a message signal to the vehicle, said message signal including at least one message, said message indicating an intended location and intended direction of travel for which said message is to be provided to an operator of the vehicle, said intended direction of travel being represented by a sequence of predetermined locations; and (b) a receiver system mounted on the vehicle, said receiver system including (1) position means for determining vehicle positions, (2) receiver means for receiving said message signal from said transmitter means and for extracting said message from said message signal, and (3) processor means for receiving said message from said receiver means, for receiving said vehicle positions from said position means, and for determining whether to provide said message to said operator of the vehicle based upon a comparison of said intended location and said intended direction of travel with said vehicle positions.

2. The system of claim 1, wherein said transmitter means comprises:

a wide-area transmitter site.

3. The system of claim 2, wherein said position means comprises:

a GPS receiver.

4. The system of claim 1, wherein said position means comprises:

a steering receiver including means for receiving a first signal from a first transmitter located near an expected path of the vehicle, means for receiving a second signal from a second transmitter located near the expected path of the vehicle, and means for determining an order of receipt by said steering receiver of said first and second signals, wherein receipt of said first and second signals indicates vehicle position and order of receipt indicates direction of travel.

5. The system of claim 1, wherein said transmitter means comprises:

a local transmitter site located near an expected path of the vehicle.

6. The system of claim 5, wherein said position means comprises:

a steering receiver including means for receiving a first signal from said local transmitter site, means for receiving a second signal from said local transmitter site, and means for determining an order of receipt by said steering receiver of said first and second signals, wherein receipt of said first and second signals indicates vehicle position and order of receipt indicates direction of travel.

7. The system of claim 1, wherein the vehicle is one of a land vehicle, a water craft, and an airborne vehicle.

8. A system for communicating a message to a vehicle, comprising:
   (a) wide-area transmitter means for communicating a message signal to the vehicle, said message signal including at least one message, said message indicating an intended location and intended direction of travel;
   (b) a local transmitter site including
      (1) a first transmitter located near an expected path of the vehicle for transmitting a first signal toward the expected path, and
      (2) a second transmitter located near the expected path for transmitting a second signal toward the expected path; and
   (c) a receiver system mounted on the vehicle, said receiver system including
      (1) position means for determining a position and direction of travel of the vehicle, said position means including
         (i) means for receiving said first and second signals, and
         (ii) means for determining an order of receipt by said receiver system of said first and second signals, wherein receipt of said first and second signals indicates said vehicle position and order of receipt indicates said direction of travel,
      (2) receiver means for receiving said message signal from said transmitter means and for extracting said message from said message signal, and
      (3) processor means for receiving said message from said receiver means, for receiving said vehicle position and said direction of travel from said position means, and for determining whether to provide said message to an operator of the vehicle based upon a comparison of said intended location and said intended direction of travel with said vehicle position and direction of travel.

9. The system of claim 8, wherein the vehicle is one of a land vehicle, a water craft, and an airborne vehicle.

10. A system for communicating a message to a vehicle traveling on a roadway, comprising:
   a first transmitter located near the roadway for transmitting a first signal toward the roadway;
   a second transmitter located near the roadway for transmitting a second signal toward the roadway; and
   a receiver on the vehicle for receiving said first and second signals when the vehicle is in proximity to said first and second transmitters and for determining whether to provide a first message to a driver of the vehicle based upon the order of receipt of said first and second signals by said receiver.

11. The system of claim 10, wherein said receiver comprises:
   means for receiving said first signal;
   means for receiving said second signal; and
   means for decoding said first message from said first signal and providing said first message to a driver of the vehicle only if receipt of said second signal occurs before receipt of said first signal.

12. The system of claim 11, wherein said second signal comprises a second message intended for the vehicle, and wherein said first receiving module further comprises:
   means for decoding said second message from said second signal, and for providing said second message to the vehicle only if receipt of said first signal occurs before receipt of said second signal.

13. The system of claim 12, wherein said first transmitter comprises:
   first memory means for storing said first message;
   first modulator means for modulating a first carrier signal with said first message to produce said first signal; and
   a first directional antenna for transmitting said first signal a first direction down the roadway.

14. The system of claim 13, wherein said second transmitter comprises:
   second memory means for storing said second message;
   second modulator means for modulating a second carrier signal with said second message to produce said second signal; and
   a second directional antenna for transmitting said second signal a second direction down the roadway.

15. The system of claim 10, further comprising:
   a message transmitter for transmitting an information signal containing a plurality of information messages,
   wherein said receiver further comprises
      means for receiving said information signal, for decoding said information signal to reproduce said plurality of information messages, and
      memory means for storing said plurality of information messages.

16. The system of claim 10, further comprising:
   a third transmitter located near the roadway for transmitting a third signal, wherein said receiver determines whether to provide said first message to the driver of the vehicle based upon the order of receipt of said first, second and third signals by said receiver.

17. The system of claim 16, wherein said receiver comprises:
   means for receiving said first signal;
   means for receiving said second signal;
   means for receiving said third signal; and
   means for decoding said first message from said first signal and providing said first message to a driver of the vehicle only if receipt of said first, second and third signals at said receiver occurs in an expected order.

18. A method for communicating a message to a vehicle traveling on a roadway, comprising:
   transmitting a first signal to the vehicle from a first transmitter;
   transmitting a second signal to the vehicle from a second transmitter;
   receiving said first and second signals at the vehicle when the vehicle is in proximity to said first and second transmitters; and
   determining whether to provide a first message to a driver of the vehicle based upon the order of receipt of said first and second signals.

19. The method of claim 18, wherein said receiving step comprises:
   receiving said first signal;
   receiving said second signal; and
   decoding said first message from said first signal, and providing said first message to the driver of the vehicle only if receipt of said second signal occurs before receipt of said first signal.

20. The method of claim 19, wherein:

said step of transmitting a second signal comprises transmitting a second signal to the vehicle from a second transmitter wherein said second signal comprises a second message intended for the vehicle; and said receiving step further comprises decoding said second message from said second signal, and providing said second message to the driver of the vehicle only if receipt of said first signal occurs before receipt of said second signal.

21. The method of claim 20, wherein said step of transmitting a first signal comprises:

retrieving said first message from first memory means;

modulating a first carrier signal with said first message to produce said first signal; and transmitting said first signal a first direction down the roadway.

22. The method of claim 21, wherein said step of transmitting a second signal comprises:

retrieving said second message from second memory means;

modulating a second carrier signal with said second message to produce said second signal; and transmitting said second signal a second direction down the roadway.

23. The method of claim 18, further comprising:

transmitting an information signal containing a plurality of information messages;

receiving said information signal at said receiver;

decoding said information signal to reproduce said plurality of information messages; and storing said plurality of information messages in third memory means.

24. The method of claim 23, further comprising:

using said first message as an address into said third memory means to select one of said plurality of information messages as said first message.

25. The method of claim 18, further comprising:

transmitting a third signal to the vehicle from a third transmitter; and receiving said third signal at the vehicle when the vehicle is in proximity to said third transmitter, wherein said determining step determines whether to provide said first message to a driver of the vehicle based upon the order of receipt of said first, second and third signals by said receiver.

* * * * *